US006765646B2

(12) United States Patent
Oka et al.

(10) Patent No.: US 6,765,646 B2
(45) Date of Patent: Jul. 20, 2004

(54) PRINT-ORDER RECEIVING APPARATUS

(75) Inventors: Shinichi Oka, Wakayama (JP); Satofumi Matsuyama, Wakayama (JP); Makoto Kikuta, Yokohama (JP); Hideharu Shiota, Hadano (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 15 days.

(21) Appl. No.: 10/233,065

(22) Filed: Aug. 30, 2002

(65) Prior Publication Data

US 2003/0043353 A1 Mar. 6, 2003

(30) Foreign Application Priority Data

Sep. 5, 2001 (JP) ....................................... 2001-268516
Sep. 5, 2001 (JP) ....................................... 2001-268695

(51) Int. Cl.[7] ........................ G03B 27/00; G03B 27/32; G03B 27/52; H04N 1/04; H04N 5/76

(52) U.S. Cl. ............................. 355/40; 355/18; 355/27; 358/487; 348/231.7

(58) Field of Search .............................. 355/18, 27, 40, 355/77; 396/2, 311, 429, 564; 358/474, 487; 348/231.7

(56) References Cited

U.S. PATENT DOCUMENTS

| | | | | | |
|---|---|---|---|---|---|
| 5,181,197 | A | * | 1/1993 | Sugie et al. | 369/75.1 |
| 5,826,042 | A | * | 10/1998 | Kirkendoll | 710/303 |
| 6,133,984 | A | * | 10/2000 | Deguchi et al. | 355/40 |
| 6,174,094 | B1 | * | 1/2001 | Manico et al. | 396/604 |
| 6,417,913 | B2 | * | 7/2002 | Tanaka | 355/39 |
| 6,522,533 | B1 | * | 2/2003 | Ikeuchi et al. | 361/686 |

FOREIGN PATENT DOCUMENTS

| | | |
|---|---|---|
| EP | 0 860 980 A2 | 8/1998 |
| EP | 1 087 607 A2 | 3/2001 |
| GB | 924704 | 5/1963 |
| WO | WO 95/28689 | 10/1995 |

* cited by examiner

*Primary Examiner*—Alan Mathews
(74) *Attorney, Agent, or Firm*—Fulbright & Jaworski L.L.P.

(57) ABSTRACT

A print-order receiving apparatus is capable of receiving a customer's order for photographic prints through a recording medium electronically recording image data therein. The apparatus includes a box-like apparatus body, a slot formed in the apparatus body for attaching the recording medium and a reading driver unit for reading the image date from the recording medium as attached in the slot. The slot defines an aperture plane with its peripheral edges, the aperture plane being upwardly inclined.

17 Claims, 5 Drawing Sheets

PRINT-ORDER RECEIVING APPARATUS

BACKGROUND OF THE INVENTION

1. Field of the Invention

The present invention relates to a print-order receiving apparatus capable of receiving a customer's order for photographic prints through a recording medium electronically recording image data therein.

2. Description of the Related Art

The print-order receiving apparatus of the above-noted type includes receiving means in the form of a slot (i.e. an elongated aperture) or a tray, to which the recording medium such as a so-called memory card available under the commercial name of "Smart Media™" or "Compact Flash™" card or MO, CD-R, etc. can be inserted or mounted. The apparatus further includes a reading driver unit for reading the image date from the recording medium attached to this receiving means. Then, the customer can place an order for an output service such as for photographic printing or CD printing based on the image data such as photographic images recorded in such recording medium. The ordered photographic printing or CD printing will be performed by means of e.g. a "minilab system" connected to the print-order receiving apparatus.

Such print-order receiving apparatus as above is generally designed for use with a small-sized general-purpose computer, typically, a personal computer. Therefore, the reading driver unit incorporated in this print-order receiving apparatus too is provided in the form of a rectangular box-like unit to be fitted within a predetermined attachment space of standardized dimensions, called "3.5 inch bay" or "5 inch bay" generally employed for mounting such unit in the box-like frame of the computer.

Therefore, if this reading driver unit of the print-order receiving apparatus is mounted in a horizontal posture just like other reading driver unit for the computer, the slot for inserting the recording medium will extend narrowly and horizontally in the end face of the box-like frame of the computer, with its aperture-delimiting edges extending along the perpendicular direction.

Then, when the print-order receiving apparatus is set in a most common situation such as a working table or a reception counter of a service shop, the customer who generally assumes the most comfortable position of standing on the nearby floor surface and faces the apparatus from this position will find the slot far blow his/her eye level. Moreover, as the slot is a narrow horizontal elongated aperture, the upper and lower sides of the rectangular aperture forming the slot will be substantially in vertical alignment with each other, hindering accurate recognition by the customer of the inserting position of the recording medium. If the customer is to smoothly insert medium without the medium's hitting against e.g. other, i.e. non-slotted portion of the apparatus, this will require a physical burden for the customer such as crouching to lower his/her eye level to the vicinity of the slot.

SUMMARY OF THE INVENTION

The present invention has been made to overcome the above-described drawback of the conventional print-order receiving apparatus. A primary object of the invention is to provide an improved print-order receiving apparatus which allows a user or a customer to attach the recording medium in a more comfortable manner.

For accomplishing the above-noted object, according to the present invention, there is provided a print-order receiving apparatus capable of receiving a customer's order for photographic prints through a recording medium electronically recording image data therein, the apparatus comprising:

a box-like apparatus body;

a slot formed in the apparatus body for attaching the recording medium;

a reading driver unit for reading the image date from the recording medium as attached in the slot;

wherein said slot defines an aperture plane with its peripheral edges, the aperture plane being upwardly inclined.

With the above feature, the print-order receiving apparatus of the invention provides a readily visible condition for the user with the upper and lower edges of the aperture of the slot being sufficiently apart from each other from the eye level of the user who assumes the most comfortable posture of standing on the nearby floor surface without e.g. crouching.

Preferably, the reading driver unit has a substantially rectangular unit defining the slot in one end face thereof, the unit being upwardly inclined.

That is, as mentioned hereinbefore, such reading driver unit mountable within the print-order receiving apparatus is typically provided with a box-like frame in the form of flat and substantially rectangular unit. Then, when the reading driver unit having such shape is mounted with an inclined posture, there is realized the upwardly inclined posture of the aperture plane delimited by the peripheral edges of the slot for attachment of the recording medium.

Accordingly, the print-order receiving apparatus allowing comfortable and smooth attachment of the recording medium to the slot can be realized with minimized costs by utilizing the reading driver unit of the standardized shape without substantial modification thereof.

Still preferably, the reading driver unit disposed with the inclined posture forms, at an upper portion thereof, a trapezoidal space as viewed sideways; and the print-order receiving apparatus further comprises a holder portion for holding a recording paper roll and a printer unit for printing order information on the recording paper unrolled from the holder portion, said holder portion and said printer unit being accommodated within said trapezoidal space with said holder portion being located deeper into the apparatus body than said printer unit and with said printer unit being confined within an outer contour of said holder unit as viewed from the front.

Namely, in the case of a print-order receiving apparatus of the type which is installed at a service shop and requires a customer's self reading/inputting operation of the image data from the recording medium which he/she has brought to the shop, it is essential for the apparatus to be equipped with a printer unit for printing and issuing a receipt recording the information used for identifying or confirming the image data read by the apparatus or the order placed on the apparatus. In such case, in order to minimize the space to be occupied at the shop for its installment, it is desired to provide a small-sized printer unit within the print-order receiving apparatus as an integral unit thereof, rather than to provide the device as a separate unit. Such printer device typically includes a printer unit for providing the printing function and a holder portion for holding a recording paper roll for feeding the recording paper to the printer unit. And, with this type of printer device consisting mainly of the printer unit and the holder portion, the printer unit is formed extremely compact and its vertical thickness in particular is much smaller than the vertical width of the holder portion. Then, if the printer unit and the holder portion are disposed side by side in the depth direction of the apparatus body, the holder portion extend significantly beyond the outer contour of the printer unit as seen in the front view. Therefore, if these printer unit and holder portion having such dimensional relationship are disposed in the conventional manner as above, there will be formed a large dead space above or below the printer unit, hence being not desirable for forming the entire apparatus compact.

Then, according to the print-order receiving apparatus of the present invention, the trapezoidal (in side view) space formed upwardly of the reading driver unit disposed with the inclined posture is effectively utilized for disposing the printer unit having the relatively low profile on the forward side within this trapezoidal space and the holder portion having the high profile on the deeper side within this space. With this arrangement, the irregular space inevitably formed by disposing the reading driver unit with the inclined posture inside the apparatus body of the print-order receiving apparatus may be efficiently utilized for forming the entire print-order receiving apparatus compact.

Preferably, a driving circuit unit for the printer unit is disposed within a space between the holder portion and the reading driver unit.

That is to say, the driving circuit unit for controlling the operation of the printer unit should advantageously be disposed in the vicinity of the printer unit in view of e.g. its noise resistance. Then, according to the print-order receiving apparatus of the present invention, it is proposed to determine the angle of the disposing inclination of the reading driver unit such that a space may be formed between the holder portion and the reading driver unit for allowing accommodation of the driving circuit unit therein. If the driving circuit unit is accommodated within the space between the holder portion and the reading driver unit in this manner, it becomes possible to form the print-order receiving apparatus even more compact. At the same time, as the driving circuit unit can achieve its original performance of e.g. high noise resistance, the print-order receiving apparatus will be more reliable and useful.

Still preferably, the print-order receiving apparatus further comprises a retractable tray capable of mounting an auxiliary recording medium which is different in kind from the recording medium to be inserted into the slot and an auxiliary reading driver unit for reading image data of the auxiliary recording medium mounted on the retractable tray, the tray being disposed laterally of the reading driver unit so as to be retractable and extendible in a substantially horizontal direction.

That is, the apparatus having the above feature is adapted for a tray type reading driver unit for mounting a recording medium (such as a CD-ROM or CD-R) on its tray. In the case of this type of unit wherein the recording medium is set on a tray, unlike the afore-mentioned type of the reading driver unit wherein the recording medium is inserted into a slot, it will be more convenient for the user if the tray is extended and retracted in the horizontal direction rather than with an inclination.

Then, according to the print-order receiving apparatus of the invention having the above-described feature, the tray type auxiliary reading driver unit is disposed so as to allow its tray to be extended and retracted in the substantially horizontal direction so as to assure the user's greater convenience. At the same time, by effectively utilizing the space formed sideways the inclined reading driver apparatus, the space inside the apparatus body of the print-order receiving apparatus is utilized even more efficiently.

Still preferably, the reading driver unit comprises a plurality of reading driver subunits which are vertically superposed one on another, each subunit having a smaller height than said auxiliary reading driver unit.

That is, the slot-type reading driver unit generally has a lower profile as well as a shorter length in the depth direction than the tray-type auxiliary reading driver unit. Therefore, even if a plurality of slot type units are stacked, this will not provide any significant height-wise imbalance relative to the tray-type auxiliary reading driver unit. Hence, it is possible to increase the number of the tray-type reading driver units without any trouble.

Preferably, the recording medium to be inserted into the slot comprises a memory card.

The memory card is manufactured generally by enclosing a semiconductor memory in a thick package, requiring proper care and protection against possible electrostatic noise or field in the vicinity of the user as well as a physical shock. Moreover, as the memory card is small, the slot into which the card is inserted is correspondingly narrow.

Then, with the above-described readily visible arrangement of the aperture formed by the peripheral edges of the slot for receiving such memory card, it becomes possible to relieve the user's anxiety when handling such delicate recording medium as the memory card described above.

Still preferably, a front face portion of the apparatus body is a panel inclined upwardly and said slot is formed in this panel.

As described hereinbefore, for disposing the reading driver unit relative to the printer unit, the shorter the depth of the reading driver unit, the better.

Then, by disposing the panel of the driver unit defining the slot with the inclination and disposing the printer unit upwardly of the reading driver unit, because of the relative positional relationship relative to the printer unit, the reading driver unit extends outwardly, thereby to realize a condition similar to a condition realized by shortening the depth dimension of the reading driver unit. Consequently, the space inside the box-like apparatus body of the print-order receiving apparatus may be utilized even more efficiently.

Preferably, the print-order receiving apparatus further comprises a monitor capable of displaying the image information read from the recording medium, the monitor having a display screen disposed with an upward inclination on a top face of the apparatus body.

With the above feature, the customer who is to place an order for printing can confirm the contents of the image and order inputted from the recording medium to the print-order receiving apparatus and confirm also the progress of the dialog-type operation until completion of the printing order by the print-order receiving apparatus. And, according to the present invention, it is proposed to provide such monitor integrally with the apparatus in a compact manner. At the same time, for assuring greater convenience and comfort for the user, the display screen is provided on the top face of the apparatus body with an upward inclination for allowing the user to view it in the standard and most comfortable posture without crouching.

Further and other features and effects of the invention will become apparent upon reading the detailed description of preferred embodiments thereof with reference to the accompanying drawings.

DESCRIPTION OF THE PREFERRED EMBODIMENTS

A preferred embodiment of a print-order receiving apparatus relating to the present invention will be described next with reference to the accompanying drawings, by way of an example of a photographic printing system using this print-order receiving apparatus.

Figure 4:
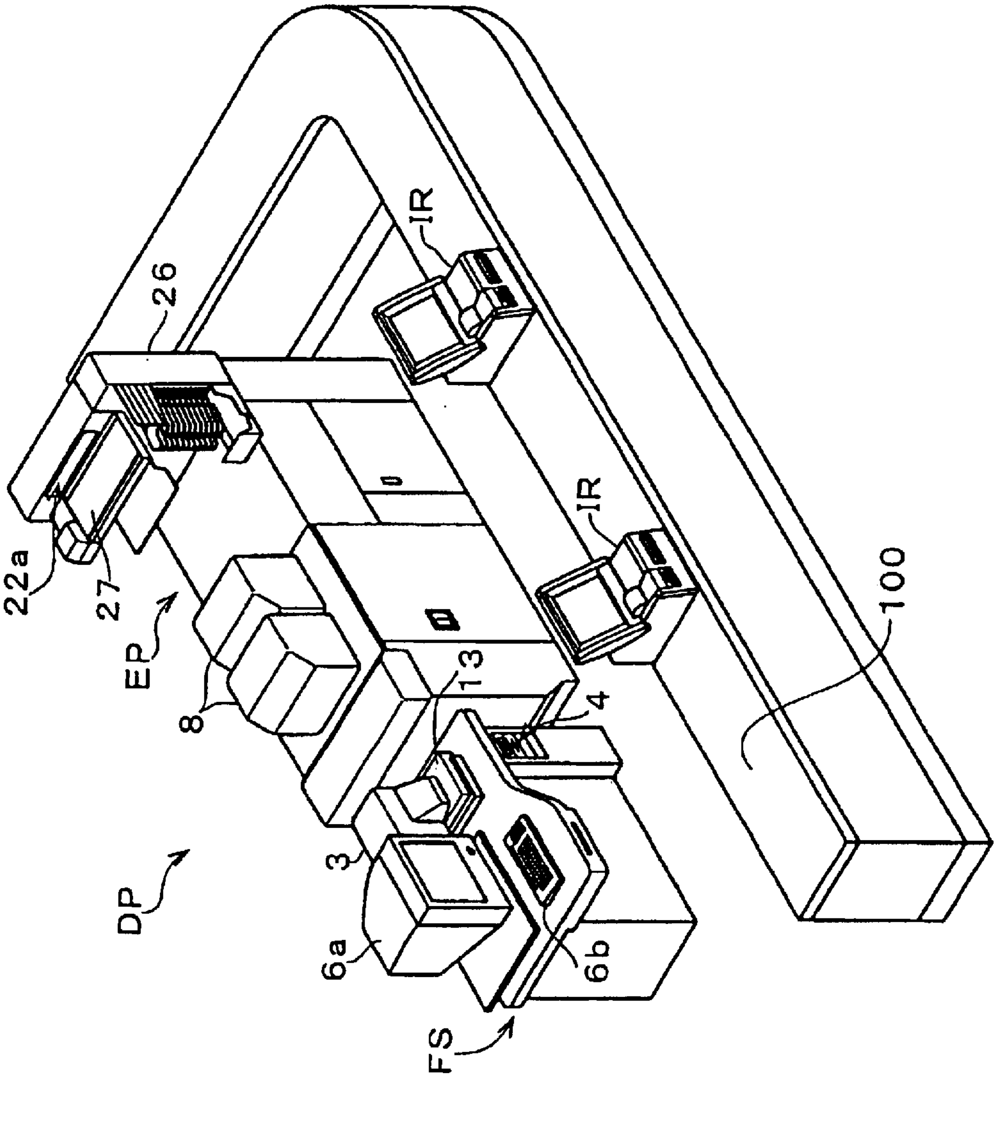
FIG. 4 is a perspective view showing an outer appearance of an photographic printing system using the print-order receiving apparatus shown in FIG. 1.

A photographic printing system DP illustrated in FIG. 4 employs a so-called digital "minilab system". This printing system DP is fixedly installed at a service shop for receiving orders for photographic printing outputs. Specifically, the printing system DP includes a print-order receiving apparatus IR for inputting image data from a recording medium electronically recording the image data therein, a film-image inputting apparatus FS for reading and inputting image data from a conventional developed photographic film 1 (to be referred to simply as "film 1" hereinafter), and an exposing-developing apparatus EP for exposing and developing the image data inputted from the print-order receiving apparatus IR or the film-image inputting apparatus FS on a print paper 2. Control units of these respective apparatuses are connected in a network. The recording medium electronically recording the image data includes a memory card ("Smart Media™", "Compact Flash™ card", etc.) a magneto-optic disk (MO), CD-ROM, CD-R, etc.

In the case of the example illustrated in FIG. 4, two print-order receiving apparatuses IR are installed on a counter 100 for allowing self-operation by customers. Incidentally, the film-image inputting apparatus FS not only provides the function of reading the image data from a film 1, but also allows inputs of the image data from the memory card or the like (not by the customer but by the service shop operator in this case) just like the print-order receiving apparatus IR.

Schematic Construction of the Print-order Receiving Apparatus IR

Figure 1:
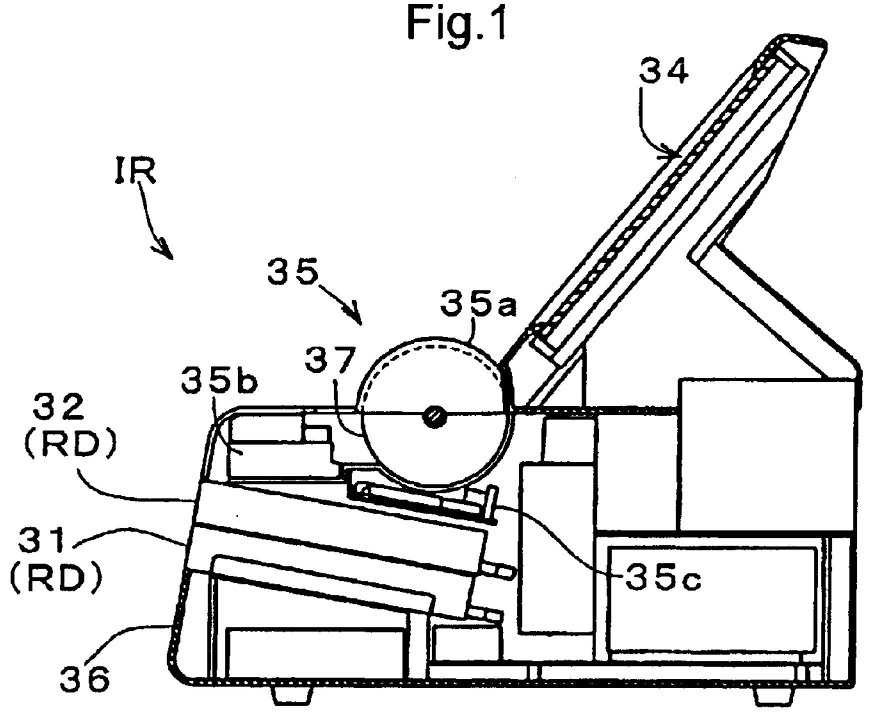
FIG. 1 is a view showing an internal arrangement of a print-order receiving apparatus relating to an embodiment of the present invention.
Figure 2:
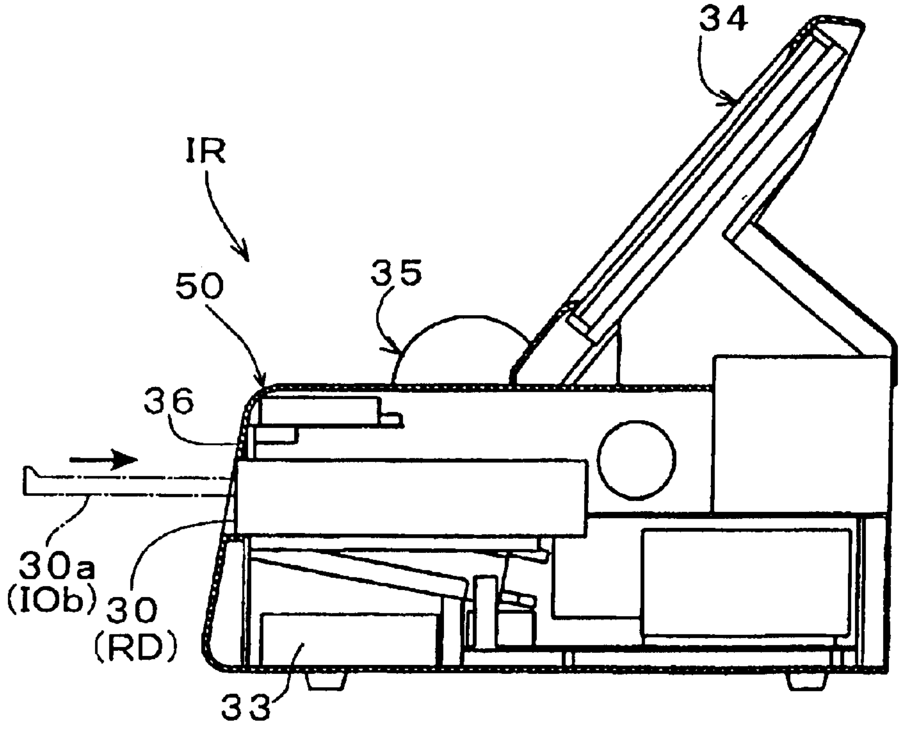
FIG. 2 is a view showing an internal arrangement of the print-order receiving apparatus shown in FIG. 1.
Figure 3:
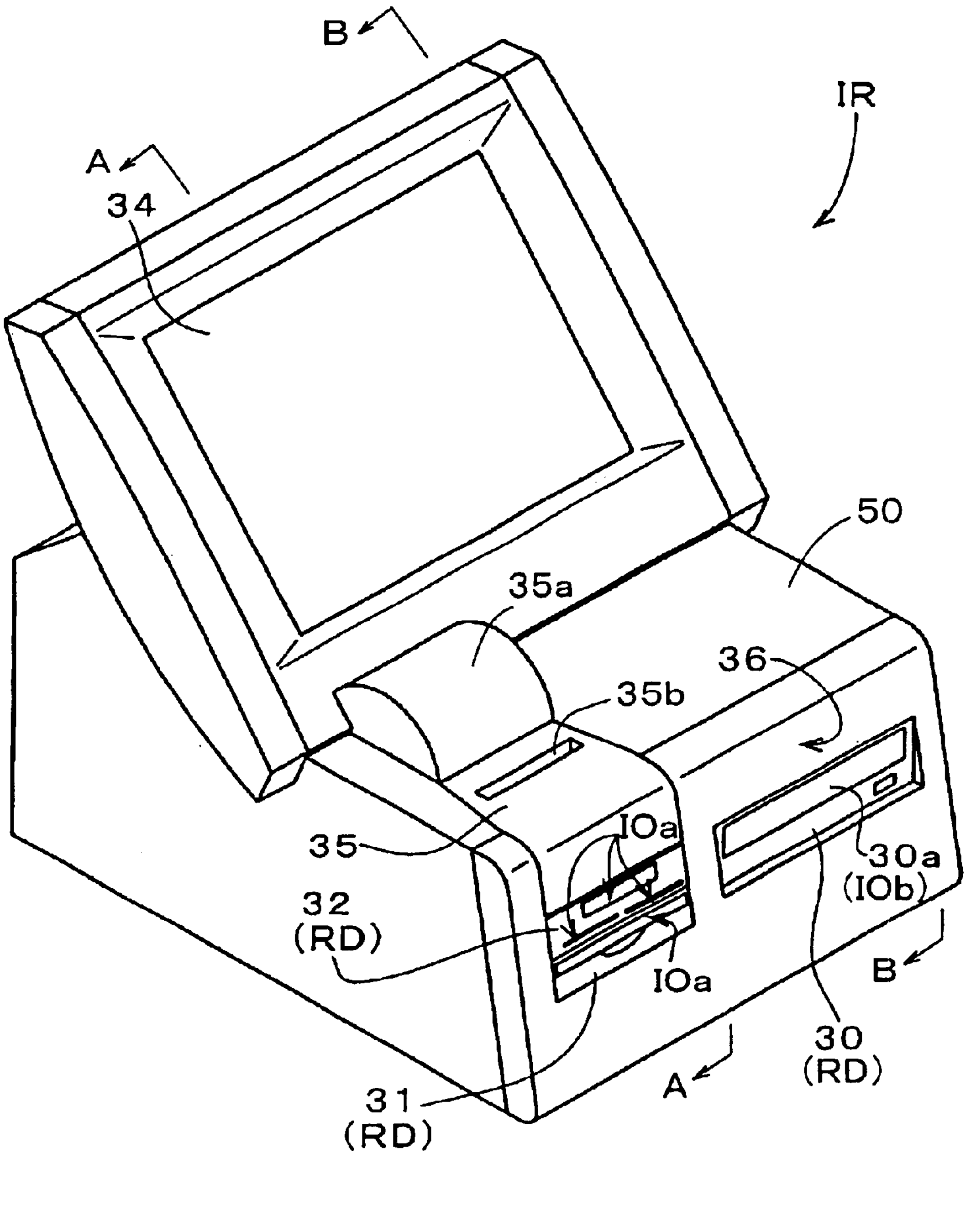
FIG. 3 is a perspective view showing an outer appearance of the print-order receiving apparatus shown in FIG. 1.

As shown in an outer appearance view of FIG. 3, the inner construction view of FIG. 1 in the direction of arrow A—A in FIG. 3 as well as in an inner construction view of FIG. 2 in the further direction of arrow B—B in FIG. 3, the print-order receiving apparatus IR includes a plurality of reading driver units RD provided to cope with a variety of kinds of recording media in order to read the image data from these various types of recording media. In the illustrated example, these reading driver units RD specifically include a memory card reader 32 for reading image data from three kinds of large, medium and small-sized memory cards, an MO drive 31 for reading image data from a magneto-optical disc (MO) and a CD-ROM drive 30 (an example of the "auxiliary reading driver unit") for reading image data from a CD-R or CD-ROM. In FIG. 1 and FIG. 2, for the sake of clearer visibility, portions of some components disposed in the periphery of the reading driver units RD are deleted from the view.

The print-order receiving apparatus IR further includes a magnetic disc device 33 (hard disc or the like) for temporarily storing the image data or the like inputted from the reading driver units RD, a liquid-crystal type monitor 34, a printer device 35, a controller (not shown) for causing the image data or the like read by the reading driver unit RD to be displayed on the monitor 34 and transmitting these image data to a main controller 6 of the film-image inputting apparatus FS, etc. The printer device 35 is a small-sized printer device incorporating therein as separate components thereof, a holder portion 35*a* for holding a recording paper roll 37, a printer unit 35*b* for printing on the recording paper 37, and a driving circuit unit 35*c* for driving the printer unit 35*b*.

Next, how the reading driver units RD and so on are arranged inside a box-like apparatus body 50 of the print-order receiving apparatus IR will be explained.

The CD-ROM drive 30 is provided in the form of a box-like unit fitted for an attachment space in a computer commonly referred to as "5-inch bay". Whereas, the MO drive 31 and the memory card reader 32 are provided in the form of box-like units sized for a further attachment space provided in the computer commonly referred to as "3.5-inch bay". All of these CD-ROM drive 30, MO drive 31 and the memory card reader 32 are provided in the form of substantially rectangular solids having a flat appearance.

As for the MO drive 31 and the memory card reader 32, one end face forming the respective box-like frame thereof defines a slot I0*a* for allowing insertion and attachment of the associated recording medium. And, this end face forming the slot I0*a* is exposed from a panel 36 provided as the front face of the box-like apparatus body 50 of the print-order receiving apparatus IR. At a position inside the reading driver unit RD rearwardly of the slot I0*a* depth-wise, a pick-up unit for reading the data from the magneto-optical disc is provided in the case of the MO drive 31, whereas terminals for electrical connection with the memory card are provided in the case of the memory card reader 32.

Incidentally, as for the CD-ROM drive 30, its end face to which the tray I0*b* for attaching the memory medium is attached is exposed from the panel 36.

The MO drive 31 and the memory card reader 32 are the slot-tye reading driver units for attaching the recording medium by inserting it into the slot I0*a* and these are also relatively small-sized reading driver units. Therefore, as shown in FIG. 1, the box-like bodies of these units are disposed with an inclined posture so as to orient an aperture plane formed by the peripheral edges of the rectangular slot I0*a* upwards. More particularly, since the aperture plane virtually formed by the peripheral edges of the slot I0*a* are in registry with the one end face front face) of the box-like body forming this slot I0*a*, the virtual aperture plane is inclined upwardly.

This angle of this inclination of the aperture plane is set as approximately 10° relative to the perpendicular direction. And, since the panel 36 forming the front face of the box-like apparatus body 50 of the print-order receiving apparatus IR is also disposed with 10° inclination for orienting its front surface upwards, the surface of this panel 36 and the front faces of the MO drive 31 and the memory card reader 32 forming the slots I0*a* are agreement in the inclination angle with each other, thereby to provide a flush surface. And, as the printer unit 35*b*, the memory card reader 32 and the MO drive 31 are arranged in this order from upward along this inclined panel 36, the MO drive 31 and the memory card reader 32 extend or project forwardly in position of the printer unit 35*b*.

With the above-described upward inclination of the virtual aperture plane, the customer or user can recognize the slots 10*a* easily and insert the recording medium into it smoothly and reliably even when he/she assumes the most standard and comfortable posture of standing on the nearby floor surface in front of the apparatus without needing to crouch to lower his/her eye level. The customer or user will appreciate this effect especially when using the memory card reader 32 having the narrower slot 10*a* than the MO drive 31 which inherently has a wider, hence, more visible slot.

Moreover, by disposing the memory card reader 32 and the printer device 35 as close as possible to each other, there may be secured a relatively large space between the MO drive 31 and the magnetic disc device 33, so that this space is effectively utilized for e.g. disposing various electric cables.

On the other hand, the CD-ROM drive 30 is a tray-type reading driver unit for attaching and loading the memory medium on this retractable tray 10*b*. In this case, the customer will set the recording medium onto the tray 10*b* drawn out toward him/her from the panel 36 surface by lowering the medium from above. And, when the customer or user pushes the tray 10*b* into its retracted position where the end face forming the front face of the tray 10*b* is substantially flush with the panel 36 surface, the image data are read from the recording medium on the tray 10*b*. And, this CD-ROM drive 30 is a large-sized driver unit having a greater length depth-wise than the small-sized driver units of the MO drive 31 and the memory card reader 32. Then, as illustrated in FIG. 2, by utilizing the space formed sideways the printer unit 35*b*, MO drive 31 and the memory card reader 32, the box-like body of this CD-ROM drive 30 is disposed with a horizontal posture so that the tray 10*b* is extended and retracted in substantially horizontal direction. This arrangement facilitates the setting operation of the recording medium such as CD-ROM or CD-R onto the tray 10*b*.

By disposing the MO drive 31 and the memory card reader 32 with the inclined posture as described above, upwardly of the memory card reader 32, there is formed a trapezoidal space which becomes vertically deeper toward the rear end of the apparatus. And, the printer device 35 is accommodated within this trapezoidal space. That is, the holder portion 35*a* of the printer device 35 has a relatively large vertical width, whereas the vertical width of the printer unit 35*b* is smaller than a half of the vertical width of the holder portion 35*a*. Then, for the holder portion 35*a*, its lower half portion is accommodated within a depth-wise half portion of the trapezoidal space, while its upper half portion projects upwardly from the apparatus body 50 of the print-order receiving apparatus IR. And, the printer unit 35*b* having the smaller vertical width is accommodated within the forward half portion of the trapezoidal space. With these arrangements, the trapezoidal space formed by disposing the MO drive 31 and the memory card reader 32 with the inclined posture can be utilized substantially without any waste.

Incidentally, the above-described arrangements can be put in another way as follows. The holder portion 35*a* is disposed on an inner deeper position in the apparatus body 30 of the print-order receiving device IR than the printer unit 35*b*, and the memory card reader 32 (an example of "reading driver unit") is disposed with the inclination such that its portion located in the inner deeper position in the box-like apparatus body is disposed adjacent the bottom face of the holder portion 35*a* and its slot 10*a* is located adjacent the bottom face of the printer unit 35*b*.

With the above-described arrangements also, there is realized the desired condition of the printer unit 35*b* being confined within the contour of the holder portion 35*a* as seen in the front view. And, when the front faces of the MO drive 31 and the memory card reader 32 are set with the approximately 10° inclination, there remains a small gap between the holder portion 35*a* and the memory card reader 32, so that the driving circuit unit 35*c* which needs to be disposed in the vicinity of the printer unit 35*b* (in order to restrict noise generation) is snugly fitted within this gap.

Incidentally, as the upper half portion of the holder portion 35*a* upwardly projects from the apparatus body 50 of the print-order receiving apparatus IR with the above-described arrangements, a replacement operation of the recording paper roll 37 can be done easily.

In other words, in the case of the small-sized reading driver unit such as the MO drive 31 and the memory card reader 32, its portion located on the inner deeper side of the box-like apparatus body extends to a position below the holder portion 35*a*. Then, if its portion located on the outer front side of the box-like apparatus body is disposed adjacent the printer unit 35*b*, the slot 10*a* will be disposed with the inclination toward the printer unit 35*b* (that is, the slight upwardly inclined orientation of the aperture plane defined by the peripheral edges of the slot 10*a*).

With the above-described vertical stacking arrangement of the printer device 35, the MO drive 31 and the memory card reader 32, there is obtained a relatively large space beside these components. Then, if the relatively large-sized CD-ROM drive 30 is disposed in this space, in combination with the arrangement of the printer device 35 at the space above the inclined memory card reader 3, the space inside the box-like apparatus body of the print-order receiving apparatus IR can be efficiently utilized for realizing compactness of the entire print-order receiving apparatus IR. The above-described vertical stacking arrangement of the MO drive 31 and the memory card reader 32 does not result in significant increase in the vertical dimension since these small-sized units have much shorter heights than that of the CD-ROM drive 30.

As shown in FIG. 3, the monitor 34 is disposed with an inclination on the top face of the apparatus body 50 of the print-order receiving apparatus IR so that its display screen is inclined upward.

The angle of this inclination of the monitor 34 (this inclination angle is greater than that of the panel 36) is set so that when the print-order receiving apparatus IR is disposed on the counter 100 as illustrated in FIG. 4, the user who assumes the most comfortable posture of standing straight on the floor surface can easily seen the display screen of this monitor 34. Further, the holder portion 35*a* of the printer device 35 is disposed in such a way that the axis of the recording paper roll 37 may be located adjacent an intersection between the to face of the apparatus body 50 of the print-order receiving apparatus IR and the extension of the display screen of the monitor 34. As a result, as the upper half portion of the holder portion 35*a* of the printer device 35 is disposed within the concave space formed between the top face of the apparatus body 50 of the print-order receiving apparatus IR and the extension of the display screen of the inclined monitor 34, the upward projection of the holder portion 35*a* from the top face of the apparatus body 50 does not hinder the visibility of the monitor 34 by the user.

Figure 6:
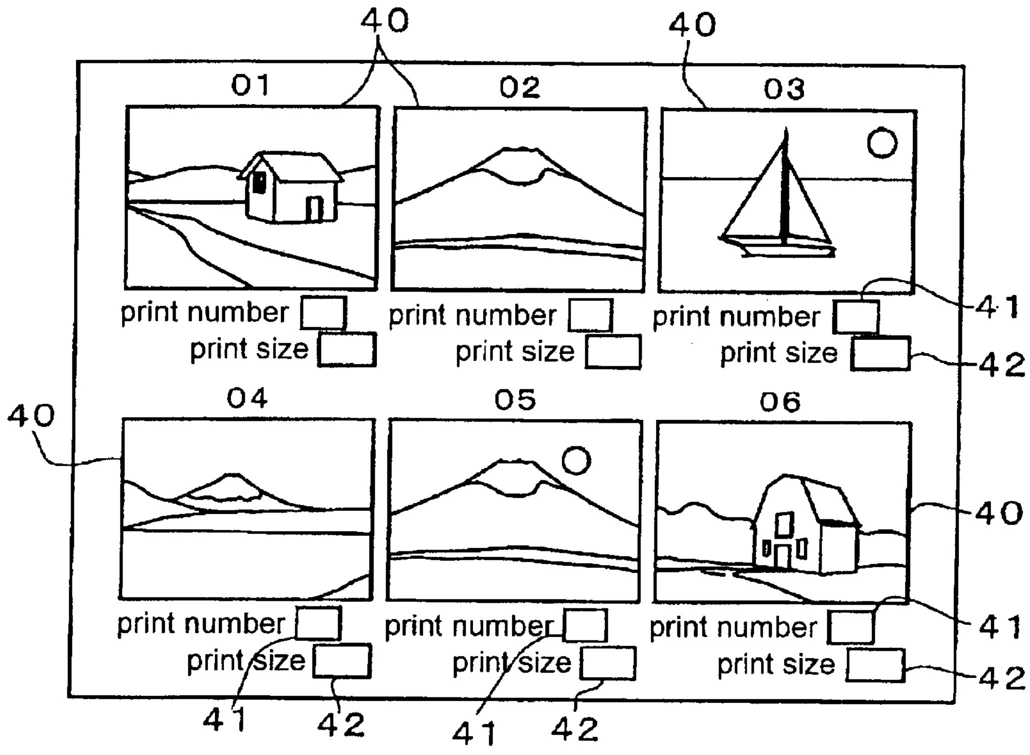
FIG. 6 is an explanatory view showing an example of a display screen contents of the print-order receiving apparatus shown in FIG. 1.

The monitor 34 is capable of displaying e.g. the image data read from the recording medium, as illustrated in FIG. 6. In the example illustrated in FIG. 6, the display screen of the monitor 34 is displaying total six image display sections 40 in the format of two rows and three columns. Each image display section 40 includes a print number input box 41 for receiving an input for a desired number of prints and a print size input box 42 for receiving input for a desired print size.

Then, the user of the print-order receiving apparatus IR can input desired numeric values into the respective input boxes 41, 42 via e.g. a touch-panel type keyboard provided at e.g. a corner on the display screen of the monitor 34.

Construction of the Film-image Inputting Apparatus FS

Figure 5:
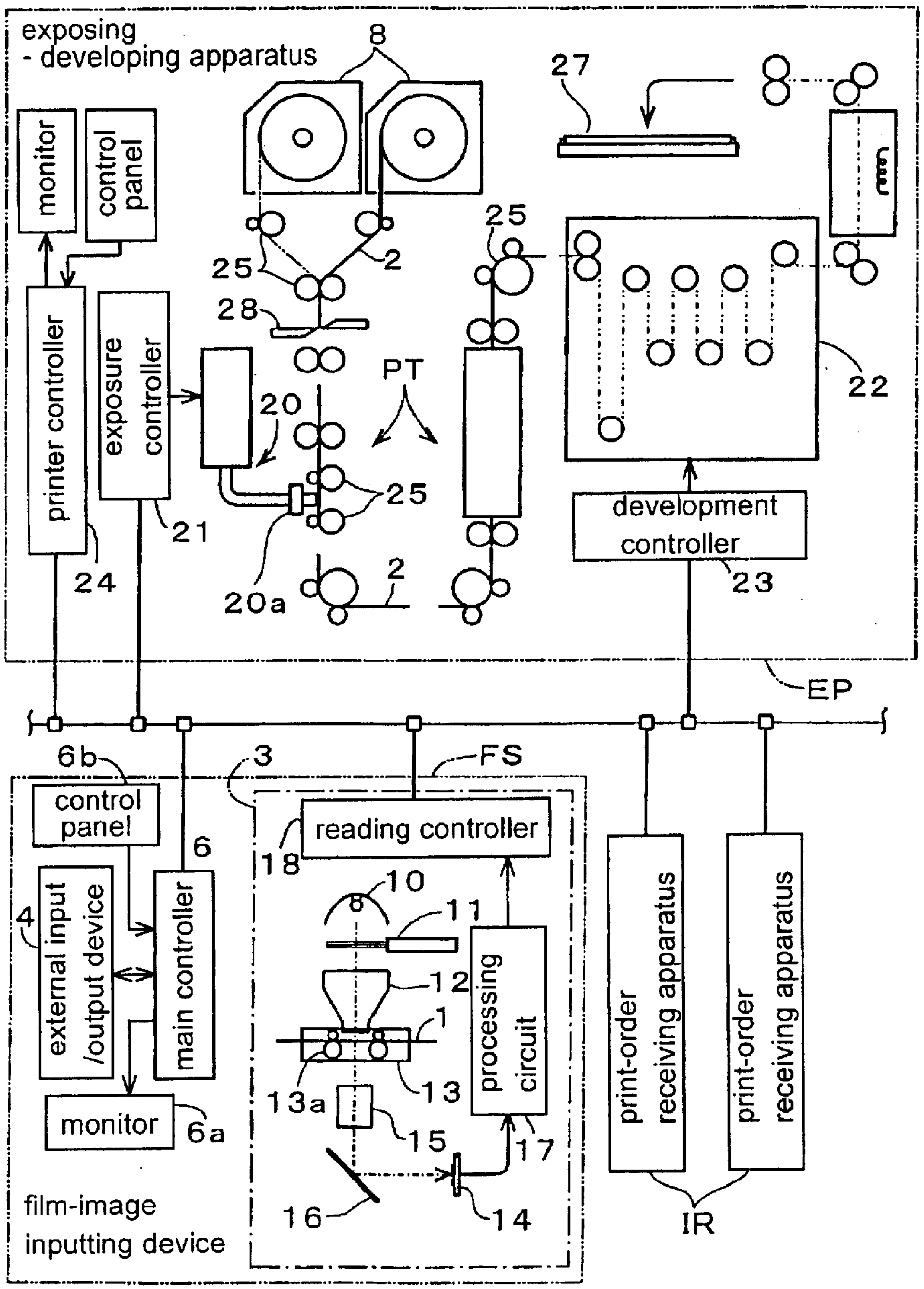
FIG. 5 is a block diagram of the photographic printing system using the print-order receiving apparatus shown in FIG. 1.

As schematically shown in the block diagram of FIG. 5, the film-image inputting apparatus FS includes a film scanner 3 for reading an image in each frame of the film 1 with transmitted light, an external input/output device 4 having a memory reader (not shown), an MO drive, a CD-ROM drive etc., and a main controller 6 comprised of a general-purpose small computer system for effecting overall control of the photographic printing system DP including the control of the external input/output device 4. The main controller 6 is connected to a monitor 6*a* for displaying a simulated image of a finished print image and various control data and a control panel 6*b* for receiving inputs for correction of exposure conditions and inputs for various control data.

The film scanner 3 includes, as major components thereof, a halogen lamp 10, a light-modulating filter 11 for modulating color balance of the beam emitted from the halogen lamp 10, a mirror tunnel 12 for uniformly mixing color components of the light beam transmitted through the light-modulating filter 11, a film mask unit 13 having a transport mechanism 13*a* for the film 1, a film mask (not shown) for receiving the film 1 at a predetermined reading position therein, a CDD line sensor unit 14 for effecting photoelectric conversion of the frame image of the film 1, a lens 15 for focusing the image of the film 1 on the CCD line sensor unit 14, a mirror 16 for bending the optical path by 90°, a processing circuit 17 for effecting e.g. amplification, A/D conversion or the line on signals outputted from the line sensor unit 14, and a reading controller 18 for effecting overall control of the film scanner 3.

The CCD line sensor unit 14 includes three rows of CCD line sensors, each row including about 5000 units of CCD elements arranged along the width of the film 1. Each CCD line sensor includes, at its light receiving face, red, green and blue color filters so as to scan the frame image of the film 1 with color separation thereof.

In response to a reading instruction from the main controller 6, the reading controller 18 is operable to initiate transportation of the film 1 set in the film mask unit 13 in an auxiliary scanning direction by the transport mechanism 13*a* and also to output the image data of the frame image of the film 1 outputted from the processing circuit 17 to the main controller 6.

The main controller 6 includes an image processor (not shown) for processing the image data of the frame image of the film 1 inputted through the film scanner 3, the image data inputted from the external input/output device 4 or the image data inputted from the print-order receiving apparatus IR into an image suitable for making a photographic print.

Schematic Construction of the Exposing-developing Apparatus EP

As shown in FIG. 5, the exposing-developing apparatus EP includes, in its box-like frame, an exposing unit 20 having a PLZT type printing head 20*a*, an exposure controller 21 for controlling the exposing unit 20, a developing unit 22 for developing the print paper 2 exposed by the exposing unit 20, a development controller 23 for controlling a print-paper transport mechanism and developing liquid within the developing unit 22, a printer controller 24 for controlling the entire exposing-developing apparatus EP, and a print-paper transport mechanism PT for transporting the print paper 2 drawn out of a print-paper magazine 8 mounted on the top face of the box-like frame to the developing unit 22 through a number of transport rollers 35, etc.

On the outside of the exposing-developing apparatus EP, as shown in FIG. 4, there are provided a sorter 26 for sorting the print papers 2 developed and then dried in the developing unit 22 according to their orders and a conveyer 27 for transporting the print paper 2 discharged from a discharge opening 22*a* to the sorter 26.

Further, in the midway of the transport path of the print-paper transport mechanism PT, there is disposed a cutter 28 for cutting the elongate print paper 2 drawn out of the print-paper magazine 8 into pieces of the predetermined print sizes.

Operations for Making Photographic Prints

Next, a process for making photographic prints by the photographic printing system DP having the above-described construction will be briefly described.

A customer operates the print-order receiving apparatus IR mounted on the counter 100 and set his/her recording medium such as a memory card, an magneto-optical disc, a CD-R or the like into the slot I0*a* or onto the tray I0*b*. Then, a reading operation for reading the image data recorded on the recording medium is initiated and record the data on the magnetic disc device 33 and also the read image is displayed on the monitor 34 of the print-order receiving apparatus IR.

Then, the customer confirms the monitor-displayed contents of the image data and inputs a print size, a print number etc. Upon completion of this, such information as the ordered number for each print size, a serial order number, a charge for the ordered print output service is printed by the printer device 35 on the recording paper 37. This printed portion of the print paper 37 is cut into an appropriate length and this is discharged as a receipt strip from the receipt discharge opening 35*b* provided on the top face of the box-like apparatus body 50. Also, concurrently with this, the read image data are transmitted to the main controller 6. Thereafter, the customer shows the receipt made of the recording paper 37 to a shop attendant and pays the charge required for the output service. Alternatively, the customer may bring the receipt back home and may revisit the shop and show it to a shop attendant and make the payment of the charge later on delivery of the prints when they are finished.

On the other hand, for making prints of frame images of the film 1, an operator of the photographic printing system DP set the film 1 to the film mask unit 13 and inputs an instruction for reading these frame images. With this, the main controller 6 instructs the film scanner 3 to read the film 1 and receives the image data of this film 1 serially from the reading controller 18.

Further, when the image data recorded on the recording medium such as a memory card, magneto-optical disc, a CD-R or the like are to be read by an operator's operation, the operator sets such recording medium to the external input/output device 4 of the film-image inputting device FS and inputs an instruction for the main controller 6 to read the data. With this, the main controller 6 gives an instruction for reading the image data to an associated drive of the external input/output device 4 and obtains the image data serially from that drive.

Then, the main controller 6, based on the image data inputted thereto in the manners described above, obtains a simulated image of the image data which would result if a print were made from such image data, by means of a calculation at the image processing circuit (not shown) and then displays this simulated image on the monitor 6*a*.

Then, the operator checks this simulated image displayed on the monitor 6*a* and inputs via the control panel 6*b* for correcting exposure conditions if proper image is not displayed on the monitor.

The image processing circuit of the main controller 6 produces exposure image data for each color component of red, green and blue under predetermined exposure conditions, based on the inputted image data and the correction input therefor if any.

These exposure image data are transmitted to the printer controller 24 of the exposing-developing apparatus EP and stored in a memory (not shown) incorporated in the printer controller 24.

When the printer controller 24 detects arrival of the forward end of the print paper 2 at the predetermined exposure start position, based on transport data of the print paper 2 transmitted from the print-paper transport mechanism PT, the controller 24 instructs the exposure controller 21 to initiate an exposure operation and also serially transmits the exposure image data to the exposure controller 21 at a speed corresponding to the exposure speed of the exposing unit 20.

Then, the exposure controller 21 activates the respective light shutters of the PLZT print head 20*a* based on the received exposure image data to make a latent image of the print image on the print paper 2.

The print paper 2 exposed by the exposing unit 20 is transported by the print-paper transport mechanism PT to the developing unit 22, where the paper is developed as being passed through the respective developing tanks thereof. The resultant developed print paper 2 is dried and then discharged through the discharge opening 22*a* onto the conveyer 27 and sorted by the sorter 26 according to the customer's order.

Other Embodiments

Next, other embodiments of the invention will be described.

(1) In the foregoing embodiment, each of the MO drive 31 and the memory card reader 32 as the recording driver unit RD for the recording medium has a box-like frame having the standard dimensions suited for the 3.5 inch bay and this box-like frame is disposed with an inclination. However, it is also possible to dispose the reading driver unit RD per se with a horizontal posture, with its end face forming the attaching portion I0 alone being upwardly inclined, so as to provide the inclined virtual aperture plane.

(2) In the foregoing embodiment, the print-order receiving apparatus IR for the image data is included in the photographic printing system DP as its integral component thereof. However, the print-order receiving apparatus IR of the invention may be employed in any other system using image data. Needless to say, it is also possible to place an order for any other image output service than photographic prints such as a CD-R recorded with the image data for the respective frames.

(3) In the foregoing embodiment, in the printer device 35, the holder portion 35*a*, the printer unit 35*b* and the driving circuit unit 35*c* are provided as separate independent components. Instead, the present invention may be applied to a printing device integrally including these components.

(4) In the foregoing embodiment, the panel 36 on the front face of the box-like apparatus body 50 of the print-order receiving apparatus IR for the image data is inclined. Instead, the front-face panel 36 may be disposed perpendicularly.

(5) In the foregoing embodiment, the virtual aperture plane defined by the peripheral edges of the attaching portion I0 for attaching a recording medium is inclined by 10° from the perpendicular direction. Instead, this aperture plane may be inclined by a greater degree as long as such inclination does not interfere with the operation of the reading driver units RD or it may conversely be inclined by an angle smaller than 10°.

(6) In the foregoing embodiment, the two different kinds of small-sized reading driver units SR are vertically stacked. Instead, the construction may include only one of them, e.g. not include the MO drive 31. Conversely, the construction may include more than three small-sized reading driver units SR stacked one upon another.

(7) In the foregoing embodiment, the CD-ROM drive 30, the MO drive 31 an the memory card reader 22, as the reading driver units RD for the recording media comprise the box-like units of the standardized dimensions adapted for the 5 inch bay or 3.5 inch bay. However, the present invention may be applied to other units of not such standardized dimensions.

The present invention may be embodied in any other way within its scope defined in the appended claims. Such modifications would be apparent for those skilled in the art from the disclosure herein.

What is claimed is:

1. A print-order receiving apparatus capable of receiving a customer's order for photographic prints through a recording medium electronically recording image data therein, the apparatus comprising a box-like apparatus body;

a plurality of reading driver units for reading the image date from a plurality of kinds of the recording medium, said plurality of reading driver units including a small-sized reading driver unit and a large-sized reading driver unit having different lengths in the depth direction of the apparatus from each other; and a printer device including a holder portion for holding a recording paper roll and a printer unit for printing order information on the recording paper, said holder portion being located deeper into the apparatus body than said printer unit, said printer unit being confined within an outer contour of said holder unit as viewed from the front;

wherein said small-sized reading driver unit of the plurality of reading driver units and the printer unit are vertically stacked adjacent each other.

2. The print-order receiving apparatus as defined in claim 1, wherein the small-sized reading driver unit comprises a plurality of reading driver subunits which are vertically superposed one on another, each subunit having a smaller height than said large-sized reading driver unit.

3. The print-order receiving apparatus as defined in claim 1, wherein the large-sized reading driver unit of the plurality of reading driver units is disposed laterally of said printer unit and said small-sized reading driver unit.

4. The print-order receiving apparatus as defined in claim 1, wherein said small-sized reading driver unit is disposed with the inclination such that its portion located in the inner deeper position in the box-like apparatus body is disposed adjacent the bottom face of the holder portion and its slot for attaching the recording medium is located adjacent the bottom face of the printer unit.

5. The print-order receiving apparatus as defined in claim 1, wherein a driving circuit unit for the printer unit is disposed within a space between the holder portion and the small-sized reading driver unit.

6. The print-order receiving apparatus as defined in claim 1, wherein a front face portion of the apparatus body is a panel inclined upwardly and said slot is formed in this panel.

7. A print-order receiving apparatus capable of receiving a customer's order for photographic prints through a recording medium electronically recording image data therein, the apparatus comprising:

a box-like apparatus body;

a slot formed in the apparatus body for attaching the recording medium;

a reading driver unit for reading the image date from the recording medium as attached in the slot;

a bolder portion for holding a recording paper roll; and a printer unit for printing order information on the recording paper unrolled from the holder portion, wherein the reading driver unit has a substantially rectangular unit defining the slot in one end face thereof, the unit being upwardly inclined so that said slot defines an aperture plane with its peripheral edges, the aperture plane being upwardly inclined; and the reading driver unit disposed with the inclined posture forms, at an upper portion thereof, a trapezoidal space as viewed sideways; said holder portion and said printer unit being accommodated within said trapezoidal space with said holder portion being located deeper into the apparatus body than said printer unit and with said printer unit being confined within an outer contour of said holder unit as viewed from the front.

8. The print-order receiving apparatus as defined in claim 7, wherein the recording medium to be inserted into the slot comprises a memory card.

9. The print-order receiving apparatus as defined in 7, wherein a front face portion of the apparatus body is a panel inclined upwardly and said slot is formed in this panel.

10. The print-order receiving apparatus as defined in claim 7, wherein the print-order receiving apparatus further comprises a monitor capable of displaying the image information read from the recording medium, the monitor having a display screen disposed with an upward inclination on a top face of the apparatus body.

11. A print-order receiving apparatus capable of receiving a customer's order for photographic prints through a recording medium electronically recording image data therein, the apparatus comprising:

a box-like apparatus body;

a slot formed in the apparatus body for attaching the recording medium;

a reading driver unit for reading the image date from the recording medium as attached in the slot;

a holder portion for holding a recording paper roll; and a printer unit for printing order information on the recording paper unrolled from the holder portion, wherein the reading driver unit has a substantially rectangular unit defining the slot in one end face thereof, the unit being upwardly inclined so that said slot defines an aperture plane with its peripheral edges, the aperture plans being upwardly inclined; and said holder portion is disposed on an inner deeper position in the apparatus body of the print-order receiving device than the printer unit, and said reading driver unit is disposed with the inclination such that its portion located in the inner deeper position in the box-like apparatus body is disposed adjacent the bottom face of the holder portion and its slot is located adjacent the bottom face of the printer unit.

12. The print-order receiving apparatus as defined in claim 11, wherein a driving circuit unit for the printer unit is disposed within a space between the holder portion and the reading driver unit.

13. The print-order receiving apparatus as defined in claim 11, wherein the recording medium to be inserted into the slot comprises a memory card.

14. The print-order receiving apparatus as defined in 11, wherein a front face portion of the apparatus body is a panel inclined upwardly and said slot is formed in this panel.

15. The print-order receiving apparatus as defined in claim 11, wherein the print-order receiving apparatus further comprises a monitor capable of displaying the image information read from the recording medium, the monitor having a display screen disposed with an upward inclination on a top face of the apparatus body.

16. A print-order receiving apparatus capable of receiving a customer's order for photographic prints through a recording medium electronically recording image data therein the apparatus comprising:

a box-like apparatus body;

a slot formed in the apparatus body for attaching the recording medium, said slot defining an aperture plane with its peripheral edges, the aperture plane being upwardly inclined;

a reading driver unit for reading the image date from the recording medium as attached in the slot;

a retractable tray capable of mounting an auxiliary according medium which is different in kind from the recording medium to be inserted into the slot;

an auxiliary reading driver unit for reading image data of the auxiliary recording medium mounted on the retractable tray, said tray being disposed laterally of the reading driver unit so as to be retractable and extendible in a substantially horizontal direction;

wherein the reading driver unit comprises a plurality of reading driver subunits which are vertically superposed one on another, each subunit having a smaller height than said auxiliary reading driver unit.

17. A print-order receiving apparatus capable of receiving a customer's order for photographic prints through a recording medium electronically recording image data therein, the apparatus comprising:

a box-like apparatus body;

a slot formed in the apparatus body for attaching memory card as one kind of the recording medium;

a reading driver unit for reading the image data from the memory card as attached in the slot, the reading driver unit having a substantially rectangular unit defining the slot in one end face thereof;

wherein said slot defines an aperture plane with its peripheral edges, the aperture plane being upwardly inclined and said recording driver unit is disposed with an inclination extending substantially normal to said aperture plane of the slot.

* * * * *